3,282,344
TUBING-GRIPPING ROD SCRAPER
James C. Tripplehorn, 1013 Mary Ellen St., Pampa, Tex.
Filed Mar. 12, 1964, Ser. No. 351,366
13 Claims. (Cl. 166—172)

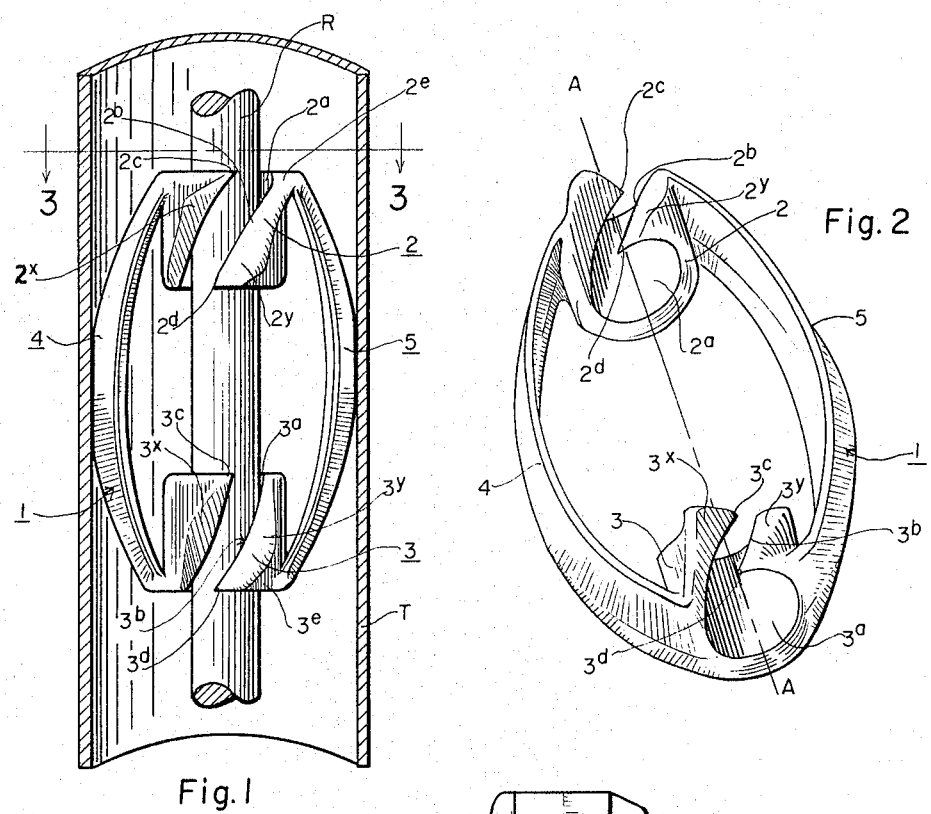
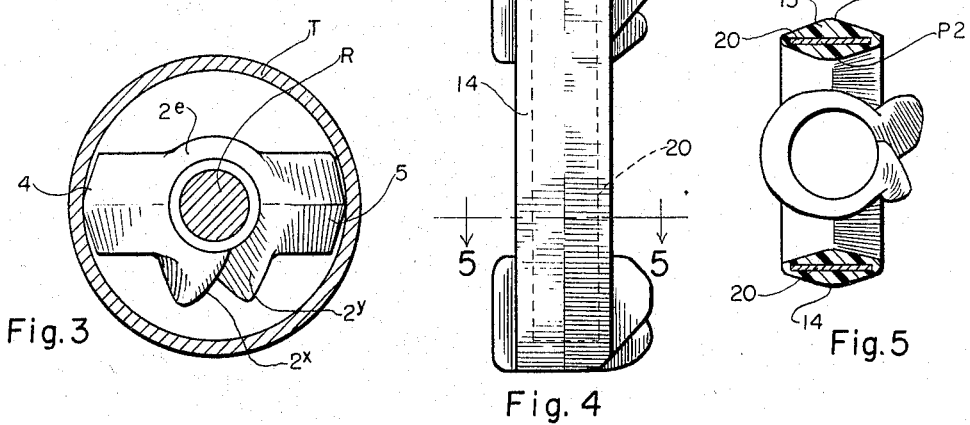
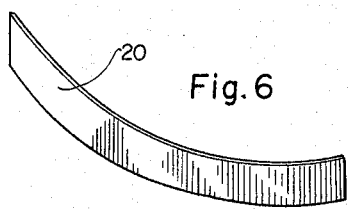

This invention relates to improvements in paraffin scrapers of the type which frictionally grip the pump tubing of a well and which have central bores therethrough to loosely guide the sucker rod, so that as the latter reciprocates in the former, the scraper cleans the sucker rod.

It is a principal object of the invention to provide resilient tubing-gripping scrapers having outer diameters which in relaxed condition are larger than the inside diameter of the tubing, these latter scrapers being radially compressible so that they can be entered inside the tubing, and so that when inside the tubing they will expand into tight engagement with the inner surface of the tubing to frictionally retain the scrapers in place therein.

It is another important object to provide a molded plastic scraper structure made of a material having a spring-like quality which ordinarily does not require the addition of auxiliary metal springs, but which structure can be successfully provided with such additions.

A further important object of the invention is to provide improved plastic rod-scrapers which can be placed loosely on the sucker rod between scrapers fixed thereto, so that when the rod is run into a well, these scrapers will be positioned in intermediate locations within the tubing according to the method set forth in my copending application entitled "Method and Apparatus for Scraping Paraffin," Serial No. 102,059, filed April 10, 1961, now Patent No. 3,141,505.

Another object is to provide a scraper having a bowed spring-like exterior which will grip the inner walls of the tubing and substantially fix the scraper therewithin, but with a frictional grip which can be overcome when it is desired to retrieve the sucker rod which these scrapers surround, the structure including two or more radially compressible and expansible spring members for gripping the tubing.

A further object of the invention is to provide a scraper structure in which the bowed spring-like members extend out to their greatest diameter near the center of the scraper and are tapered inwardly at the ends of the scraper so as to provide a streamlined structure which will not snag upon tool joints or other obstructions within the tubing.

It is a further very important object of the present invention to provide a rod scraper which is molded from a plastic which, in the presence of high temperatures and corrosive fluids often found in oil wells, exhibits excellent stability with respect to its mechanical dimensions; it is an electrical insulator to prevent electrolysis; and in addition has excellent acid and oil resistant properties. The range of plastics which exhibit satisfactory physical and chemical properties, and at the same time may be molded to the desired form, includes the following:

Polyvinylidene chloride
Polyamides; molding type, nylon
Polytetra-fluoro ethylene
Polychloro-trifluoro ethylene
Polymethyl alpha chloro-acrylate
Polyester diallyl phthalate
Poly acetal resin One of the properties exhibited by scrapers made of one of the above plastics includes the important characteristic that the very paraffin which the device according to the present invention is intended to scrape, has very little tendency to stick to the plastic surfaces since these surfaces are very smooth and non-porous. This is one important and unobvious property which distinguishes the present plastic scrapers from prior art metal devices, the paraffin having a strong tendency to adhere to the metal scrapers in the same manner as it adheres to other metal objects located in the well, such as the tubing and the sucker rod.

Still another object of the present invention is to provide a plastic paraffin scraper having minimum weight, and having maximum oil-passage clearance so as to permit the maximum flow of oil therepast and the maximum washing effect of the flow of oil in contact with the scraper to reduce paraffin deposits on the latter.

A further important object of the invention is to provide an elongated scraping structure having spaced collars which loosely surround and guide the rod, and scrape its surface. Each collar has a slot through its side wall through which the sucker rod is passed when installing the scraper thereabout. The slots through the several collars are in the same angular location and located between the same two spring-like bows, but these slots are not longitudinally aligned with the axis of the bore through the two collars. Rather, the slots are skewed out of alignment with the axis of the bore so as to provide each collar with circumferentially overlapping ends of the slots so that they scrape the entire sucker rod surface and do not leave an unscraped rib of paraffin on one side of the sucker rod.

In order to provide herein an example of satisfactory proportioning of the sucker rod, this specification discusses a practical working embodiment of the scraper built for the purpose of scraping 5/8" sucker rod within 2" nominal tubing. The outside diameter of the nylon scraper in relaxed condition was made about 1/4" larger than the inside diameter of the tubing, and the bore through the collars was made about 1/16" larger than the diameter of the sucker rod.

Other objects and advantages of the present invention will become apparent during the following discussion of the drawing, wherein:

FIG. 1 is an elevation view, partly in cross-section, showing a length of pump tubing having a sucker rod extending therethrough, and equipped with a tubing-gripping scraper according to the present invention, through which the sucker rod freely passes;

FIG. 2 is an enlarged perspective view of the scraper according to FIG. 1;

FIG. 3 is a section view taken along line 3—3 of FIG. 1;

FIG. 4 is an elevation view of a scraper similar to the scraper shown in FIG. 1, this view being rotated 90° about the axis of the bore through the scraper with respect to the view shown in FIG. 1, and the scraper shown in FIG. 4 being modified somewhat by the inclusion therein of metal grip-increasing spring means;

FIG. 5 is a section view taken along line 5—5 of FIG. 4; and

FIG. 6 is a perspective detailed view of one of the bow-reinforcing metal springs of the type incorporated in the modifications shown in FIGS. 4 and 5.

Referring now to the drawing, FIG. 1 shows a sucker rod R disposed within a length of pump tubing T, the latter being shown in cross-section so as to expose to view a paraffin scraper according to the present invention located within the tubing. The paraffin scraper illustrated in FIG. 1 may or may not contain auxiliary metal leaf springs to increase the frictional grip of the scraper on the tubing T.

In an event, the paraffin scraper 1 itself comprises a plastic body structure including two collar members 2 and 3 joined together by two or more bowed spring-like members 4 and 5, in the present practical illustration. The collar members 2 and 3 have axially aligned bores 2a and 3a, the diameters of which are substantially greater than the diameter of the sucker rod. For instance, a scraper sized to fit a 5/8" diameter sucker rod should have bores 2a and 3a about 1/16" greater than 5/8" so that the sucker rod can always slide freely within the bores 2a and 3a.

Since the scraper is made of resilient deformable material, the collars are provided with slots 2b and 3b through which the sucker rod can be entered into the bores 2a and 3a respectively, and lip members 2x, 2y, 3x and 3y are provided with outwardly flaring surfaces to guide the sucker rod into the slots and spread the collars open when installing the scraper around the sucker rod. The basic purpose of the present scraper is to have the collars 2 and 3 clean the sucker rod R as it reciprocates in the bores 2a and 3a, and therefore it is important to provide means which will scrape the entire surface of the sucker rod, without leaving any longitudinal unscraped ridges of paraffin. Therefore, the slots 2b and 3b are skewed so that the direction of the slot makes an angle with respect to the axis A—A of the scraper, FIG. 2. It is necessary that the directions of each of the slots 2b and 3b be sufficiently skewed with respect to the axis A—A that the tips 2c and 2d, and the tips 3c and 3d overlap circumferentially of the rod, as is clearly shown in FIG. 1. This structure provides a scraper having a slot for installing the sucker rod, but wherein the scraper still cleans the entire annulus of the rod as it is reciprocated.

The bow members 4 and 5 are preferably fixed and blended smoothly into the outermost ends of the two collars so as to provide a well streamlined structure having a minimum tendency to snag upon an obstruction, such as a tool joint in the tubing string. Ordinarily, the bow members 4 and 5, in the relaxed position of the scraper, have their outermost extremities spaced from the axis of the scraper by a distance greater than the radius of the inside of the tubing T. In the event that three or more bow members are used, the scraper is shaped so as to fit, without deformation, within a cylinder of greater diameter than the inside diameter of the tubing, whereby when the scraper is entered into the tubing it will be deformed inwardly, thereby compressing the bow members to provide a natural spring action permitting the scraper to position itself within the tubing, and to adequately resist displacement from such position.

One of the structural advantages of the molded scraper is that it can have a relatively smooth and streamlined shape which will introduce minimum turbulence into the well fluids flowing therepast. In the above-mentioned working embodiment of the invention which comprises a homogeneous molded nylon assembly identical to that shown in FIG. 2, it requires about 15 pounds of radial pressure to deflect the two bow members 4 and 5 inwardly from their 2 1/4" relaxed diameter to a 2" compressed diameter.

The bow members are approximately diamond-shaped in cross-section, as can be seen in FIG. 5, this cross-sectional shape providing more resistance to bending and therefore a better grip than a flat shape would provide which did not have the two peaks P1 and P2 extending outwardly therefrom on both sides, and this shape also giving the scraper a contour which will provide multiple-point contact with the 2" tubing, especially after the bow member wears in a little bit on its outer surface as a result of rubbing occurring while it is being lowered into the well on the sucker rod.

Each end of the scraper includes a flat surface, such as the surfaces 2e and 3e, serving as abutments to prevent the present scraper from being driven into telescoping engagement with adjacent scrapers fixed to the tubing. The present scrapers are preferably disposed along the sucker rod in alternating arrangement with such fixed scrapers, all according to the disclosure in my above-mentioned copending patent application.

FIGS. 4 and 5 teach a modification of the present invention in which the bow members 14 and 15 are provided with auxiliary metal leaf springs 20, FIG. 6, for the purpose of increasing the spring action of the bow members without increasing their cross-sectional area. By this expedient, a scraper can be provided which can maintain a greater grip on the tubing, but without increasing the amount of obstruction to the flow of oil presented by the scraper.

Except in cases where an unusually tight grip is necessary between the scraper and the tubing, the form of the scraper without the metal spring 20 would be preferable, since metal parts are subject to corrosion. It is also less expensive to manufacture a homogeneous scraper consisting entirely of one of the plastics set forth above.

I do not limit my invention to the exact form shown in the drawing, for obviously changes may be made therein within the scope of the following claims.

I claim:

1. In oil well equipment, a scraper and guide comprising a structure molded or resilient deformable material including two annular collar members each having a bore therethrough and the axes of the bores being mutually aligned, and plural outwardly bowed members disposed symmetrically about the axis longitudinally aligned therewith and attached at their opposite ends to different collar members and said bowed members supporting the latter in mutually spaced relationship, the collars both having slots through one side into the bore but narrower in width than the diameter of the bore, and said bowed members comprising plastic strips integrally joining the collar members at their ends, and including embedded in the strips metal leaf spring members to increase their resistance to deformation.

2. In oil well equipment, a scraper and guide comprising a structure molded of resilient deformable material including two annular collar members each having a bore therethrough and the axes of the bores being mutually aligned, and plural outwardly bowed members disposed symmetrically about the axis longitudinally aligned therewith and attached at their opposite ends to different collar members and said bowed members supporting the latter in mutually spaced relationship, the collars both having slots through one side into the bore but narrower in width than the diameter of the bore and the collar members having lip portions along the sides of the slots flared outwardly to a mutual separation greater than the slot width.

3. In a scraper and guide as set forth in claim 2, the slots being skewed with respect to the axis of the bores.

4. In oil well equipment, a scraper and guide comprising a one-piece structure consisting entirely of resilient deformable plastic material including two annular collar members each having a bore therethrough and the axes of the bores being mutually aligned, and plural outwardly bowed members disposed symmetrically about the axis longitudinally aligned therewith and attached at their opposite ends to different collar members, and said bowed members comprising plastic strips having a diamond-shaped cross-section and smoothly entering the contour of the collar members at each of their ends and supporting the latter in mutually spaced relationship.

5. The scraper and guide set forth in claim 4, wherein said material is nylon.

6. A scraper for use in cleaning a sucker rod within a string of tubing comprising a resilient plastic molded structure including two collar members mutually spaced apart and having bores larger in diameter than the sucker rod and disposed in mutual alignment, and each collar member having a slot therethrough communicating with the bore and narrower in width than the diameter of the bore, and at least two bowed members bridging the space between the collars, the bowed members being attached at their ends to the collars and symmetrically located therearound, the bowed members in relaxed position bowing outwardly beyond the collar members to a diameter greater than the inside diameter of the tubing.

7. In a scraper and guide as set forth in claim 6, said bowed members comprising plastic strips integrally joining the collar members at their ends, and including embedded in the strips metal leaf spring members to increase their resistance to deformation.

8. In a scraper and guide as set forth in claim 6, the collar members having lip portions along the sides of the slots flared outwardly to a mutual separation greater than the slot width.

9. A scraper for use in cleaning a sucker rod within a string of tubing comprising a resilient homogeneous molded structure including two collar members mutually spaced apart and having bores larger in diameter than the sucker rod and disposed in mutual alignment, and each collar member having a slot therethrough communicating with the bore and narrower in width than the diameter of the bore, and at least two bowed members bridging the space between the collars, the bowed members being attached at their ends to the collars and symmetrically located therearound, the bowed members in relaxed position bowing outwardly beyond the collar members to a diameter greater than the inside diameter of the tubing.

10. In a scraper as set forth in claim 9, the slots in the two collars being located in the same space between bowed members.

11. In a scraper as set forth in claim 9, the outer ends of the two collars being blunted to provide transverse abutment surfaces at the ends of the scraper.

12. A scraper for use in cleaning a sucker rod within a string of tubing comprising plural mutually spaced axially aligned annular deformable collar members each having an axial bore therethrough sized to freely receive said sucker rod, and each collar member having a slot therethrough communicating with the bore but narrower in width than the diameter of the sucker rod, the collar members having flared outwardly-opening lip portions to receive the sucker rod and start it through the slot and into the bore; and plural deformable longitudinally-disposed bowed members each integrally attached at its opposite ends to different collar members, the bowed members bulging outwardly to their greatest extents intermediate the collar members and tapering smoothly at their ends into the outer surfaces of the collar members, the diameter of the scaper being normally greater intermediate the collars than the inside diameter of the tubing, and the slots being skewed out of alignment with said axis.

13. A scraper for use in cleaning a sucker rod within a string of tubing comprising plural mutually spaced axially aligned annular deformable collar members each having an axial bore therethrough sized to freely receive said sucker rod, and each collar member having a slot therethrough communicating with the bore but narrower in width than the diameter of the sucker rod, the collar members having flared outwardly-opening lip portions to receive the sucker rod and start it through the slot and into the bore; and plural deformable longitudinally-disposed bowed members each integrally attached at its opposite ends to different collar members, the bowed members comprising resilient strips having a diamond-shaped cross-section, and these strips bulging outwardly to their greatest extents intermediate the collar members and tapering smoothly at their ends into the outer surfaces of the collar members, the diameter of the scraper being normally greater intermediate the collars than the inside diameter of the tubing, and the slots being skewed out of alignment with said axis.

References Cited by the Examiner
UNITED STATES PATENTS

| 2,611,664 | 9/1952 | Kothny | 166—241 |
| 2,931,440 | 4/1960 | Lebourg | 166—241 |
| 2,944,608 | 7/1960 | Rush | 166—241 |
| 3,141,505 | 7/1964 | Tripplehorn | 166—176 X |

JACOB L. NACKENOFF, *Primary Examiner.*

CHARLES E. O'CONNELL, *Examiner.*

D. H. BROWN, *Assistant Examiner.*